(12) United States Patent
Ranjan et al.

(10) Patent No.: US 11,847,503 B2
(45) Date of Patent: Dec. 19, 2023

(54) EXECUTION OF FUNCTIONS BY CLUSTERS OF COMPUTING NODES

(71) Applicant: Hewlett Packard Enterprise Development LP, Houston, TX (US)

(72) Inventors: Jyoti Ranjan, Bangalore Karnataka (IN); Prabhu Murthy, Bangalore Karnataka (IN); Siddhartha Singh, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 343 days.

(21) Appl. No.: 17/073,319

(22) Filed: Oct. 17, 2020

(65) Prior Publication Data

US 2021/0232440 A1 Jul. 29, 2021

(30) Foreign Application Priority Data

Jan. 28, 2020 (IN) ............................. 202041003806

(51) Int. Cl.
*G06F 9/50* (2006.01)
*H04L 9/40* (2022.01)

(52) U.S. Cl.
CPC ........ *G06F 9/5083* (2013.01); *H04L 63/0853* (2013.01)

(58) Field of Classification Search
CPC ........................... G06F 9/5083; H04L 63/0853
See application file for complete search history.

(56) References Cited

U.S. PATENT DOCUMENTS

| 7,287,254 | B2 * | 10/2007 | Miller | G06F 9/4881 718/102 |
| 7,900,206 | B1 * | 3/2011 | Joshi | G06F 11/2035 714/48 |
| 8,930,536 | B2 | 1/2015 | Jackson et al. | |
| 10,404,787 | B1 * | 9/2019 | Florissi | G06F 9/5083 |
| 2004/0153481 | A1 | 8/2004 | Talluri | |
| 2004/0205693 | A1 | 10/2004 | Alexander et al. | |
| 2010/0122255 | A1 * | 5/2010 | Druyan | H04L 67/62 718/102 |
| 2010/0161973 | A1 * | 6/2010 | Chin | H04L 63/08 726/20 |
| 2010/0169927 | A1 * | 7/2010 | Yamaoka | H04N 21/4667 725/46 |

(Continued)

OTHER PUBLICATIONS

Tuor et al. "Online Collection and Forecasting of Resource Utilization in Large-Scale Distributed Systems", In 2019 IEEE 39th International Conference on Distributed Computing Systems (ICDCS) (pp. 133-143) (Year: 2019).*

(Continued)

*Primary Examiner* — Meng Ai T An
*Assistant Examiner* — Willy W Huaracha
(74) *Attorney, Agent, or Firm* — Sheppard Mullin Richter & Hampton LLP

(57) ABSTRACT

Example techniques for execution of functions by clusters of computing nodes are described. In an example, if a cluster does not have resources available for executing a function for handling a service request, the cluster may request another cluster for executing the function. A result of execution of the function may be received by the cluster and used for handling the service request.

11 Claims, 7 Drawing Sheets

(56) References Cited

U.S. PATENT DOCUMENTS

| | | | | |
|---|---|---|---|---|
| 2013/0086645 A1* | 4/2013 | Srinivasan | ............ | H04L 9/3234 726/4 |
| 2013/0145375 A1* | 6/2013 | Kang | ................. | G06F 9/45558 718/104 |
| 2014/0189109 A1* | 7/2014 | Jang | ..................... | G06F 9/5077 709/224 |
| 2015/0341223 A1* | 11/2015 | Shen | .................... | H04L 41/122 709/223 |
| 2019/0163754 A1 | 5/2019 | Huang et al. | | |
| 2019/0273779 A1 | 9/2019 | Ranjan et al. | | |
| 2019/0286373 A1 | 9/2019 | Karumbu et al. | | |
| 2019/0342176 A1 | 11/2019 | Barry et al. | | |
| 2020/0034459 A1* | 1/2020 | Rabe | .................... | G06F 16/273 |
| 2020/0073722 A1* | 3/2020 | Jackson | ............... | G06F 9/5072 |
| 2022/0156115 A1* | 5/2022 | Zeng | ...................... | G06F 9/505 |

OTHER PUBLICATIONS

Amazon Web Services, Inc., "Working with Aurora Multi-Master Clusters," 2019, pp. 1-32, Retrieved from the Internet on Nov. 15, 2019 at URL: <docs.aws.amazon.com/AmazonRDS/latest/AuroraUserGuide/aurora-multi-master.html>.

Slurm Workload Manager—Multi-Cluster Operation, retrieved on Jan. 8, 2020; from https://slurm.schedmd.com/multi_cluster.html.

* cited by examiner

EXECUTION OF FUNCTIONS BY CLUSTERS OF COMPUTING NODES

BACKGROUND

A programming function, also referred to as a function, may be a section of a program that may perform a specific task. An example function is a search function that is to search for an item in a database. A function may be executed, for example, in response to a service request. The function may be executed in a cluster of computing nodes, interchangeably referred to as a cluster.

BRIEF DESCRIPTION OF DRAWINGS

The following detailed description references the figures, wherein.

DETAILED DESCRIPTION

Figure 1:
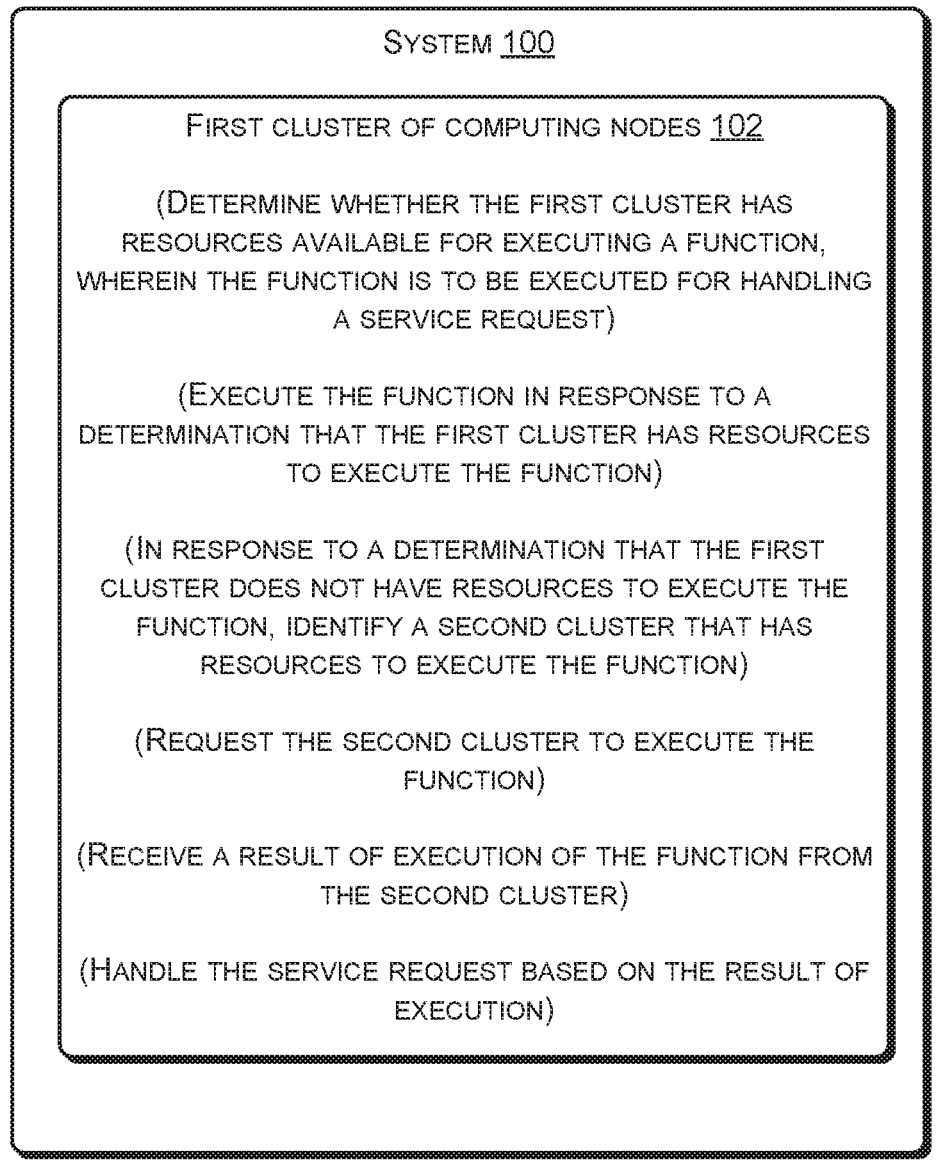
FIG. 1 illustrates a system for facilitating execution of programming functions by clusters of computing nodes, according to an example implementation of the present subject matter.

A function that is to perform a task may be uploaded to a cluster by a developer of the function. The function may then be hosted in a node of the cluster. An example of a cluster is a cluster that operates a serverless computing environment, in which custom application code is run in managed and ephemeral containers on a Functions-as-a-Service (FaaS) platform. Further, a function hosted in the serverless computing environment may be referred to as a serverless function.

A function may be executed upon invocation, for example, in response to a service request. The execution of the function may involve consumption of computing resources of the cluster. Generally, the cluster has a finite amount of computing resources. If the cluster receives more service requests in a period of time than what its computing resources can handle, the cluster may be unable to handle all of the service requests. In such cases, the cluster may refuse to handle one or more of the service requests or may fail.

The present subject matter relates to execution of functions by clusters. With the implementations of the present subject matter, high volumes of service requests may be handled by the clusters even in case of insufficient resources being available with the cluster by sharing workload with other clusters.

In accordance with an example implementation, a plurality of clusters may form a community of clusters, also referred to as a community. The clusters of the community may share workload among themselves when a cluster receives more service requests than it can handle. For instance, a first cluster of the community may receive a service request that is to be handled by executing a function. The first cluster may determine if it has resources to execute the function. If it has the resources, the first cluster may perform the execution. If the first cluster does not have resources to execute the function, the first cluster may identify a second cluster of the community that has resources available for executing the function and may request the second cluster to execute the function. Subsequently, the second cluster may execute the function and return the output of the execution to the first cluster. The output of the execution may be utilized by the first cluster to handle the service request.

In an example, the community may be managed by a community manager. The community manager may monitor resource availability information of each cluster of the community and publish the monitored information. Based on the resource availability information, an overloaded cluster, such as the first cluster, may select another cluster of the community, such as the second cluster, to which the request for execution of function is to be sent. Alternatively, the community manager may select the cluster to which the request is to be sent based on the resource availability information.

The community manager may utilize a token to regulate the sharing of workload among the clusters of the community. The token may be used to establish a borrower-lender relationship between a borrower cluster and a lender cluster. The borrower cluster may the cluster that requests another cluster to execute a function and the lender cluster may be the cluster that executes the function on behalf of the borrower cluster. The token may include an identifier of the borrower cluster, such as the first cluster, and may be sent to the lender cluster, such as the second cluster. Upon receiving a request from the borrower cluster, the lender cluster may confirm an identity of the borrower cluster based on the token and may accept the request for execution upon confirmation. Accordingly, the token prevents exploitation of the lender cluster by a cluster outside of the community.

The present subject matter improves handling of service requests by clusters of computing nodes. For instance, a cluster burdened with a high number of service requests may request another cluster with available resources to execute functions corresponding to at least some of the service requests. Thus, the burdened cluster may be prevented from refusing service requests and from failing. Therefore, the overall performance of the clusters in the community is improved. Further, the usage of tokens makes the sharing of workloads among the clusters more secure and efficient.

The present subject matter can be utilized by clusters that operate a serverless computing environment, Since functions are executed on-demand in ephemeral containers, a cluster experiencing a sudden increase in the number of incoming service requests may request another cluster of the community to execute functions corresponding to some or all of the service requests. Further, the present subject matter can be utilized for on-premises clusters, which tend to have finite resources and may lack the resources to handle a transient increase in the number of service requests.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 for facilitating execution of programming functions by clusters of computing nodes, according to an example implementation of the present subject matter. A programming function, also referred to as a function, may be part of an application code, i.e., code executable to implement an application. A clusters of computing nodes may be interchangeably referred to as a cluster and may include one or more computing nodes. The resources of the computing nodes, such as memory resources, storage resources, and processor, may be pooled and managed together, as if belonging to a single computing node. For instance, the memory resources of the computing nodes of a cluster may be pooled together and managed as if it is the memory of a single computing node. The computing nodes may be physical computing nodes, such as a server, a laptop, or a desktop, or may be virtual computing nodes, such as a virtual machine (VM), which are hosted in physical computing nodes. A computing node may be interchangeably referred to as a node.

The system 100 may include a first cluster 102. The system 100 may be implemented as a computing device, such as a server, a laptop, or a desktop, or a collection of computing devices. A computing device of the system 100 may act as a node of a cluster, such as the first cluster 102, or may host a node of the cluster. For instance, if the first cluster 102 includes a first virtual computing node hosted in a first computing device, the system 100 may include the first computing device. Similarly, if the first cluster 102 includes a first virtual computing node hosted in a first computing device and a second virtual computing node hosted in a second computing device, the system 100 may include the first computing device and the second computing device.

The first cluster 102 may be involved in handling service requests corresponding to a function by executing the function. In operation, the first cluster 102 may receive a service request that is to be serviced by executing a function. The first cluster 102 may determine whether the first cluster 102 has the resources available for executing the function. If it is determined that the first cluster 102 has the resources, the first cluster 102 may execute the function. Sometimes, the first cluster 102 may be unable to handle the first service request due to resource unavailability. For instance, the resources of the first cluster 102 may be utilized for executing functions corresponding to other service requests.

If it is determined that the first cluster does not have the resources available for executing the function, the first cluster 102 may identify a second cluster that has the resources for executing the function. The first cluster 102 and the second cluster may be members of a community of clusters. The identification of the second cluster may be, for example, based on an input from a community manager (not shown in FIG. 1) of the community of clusters.

Thereafter, the first cluster 102 may request the second cluster to execute the function and may receive a result of execution of the function from the second cluster. Subsequently, the first cluster 102 may handle the service request based on the result of execution.

The handling of the service request by the first cluster 102 using resources of the second cluster will be explained in greater detail below. In the below description, a cluster, such as the first cluster 102, that receives a service request and requests another cluster to execute a function to handle the service request may be referred to as a borrower cluster or a borrower. Further, the other cluster, such as the second cluster, which executes the function in response to the request, may be referred to as a lender cluster or a lender.

Figure 2:
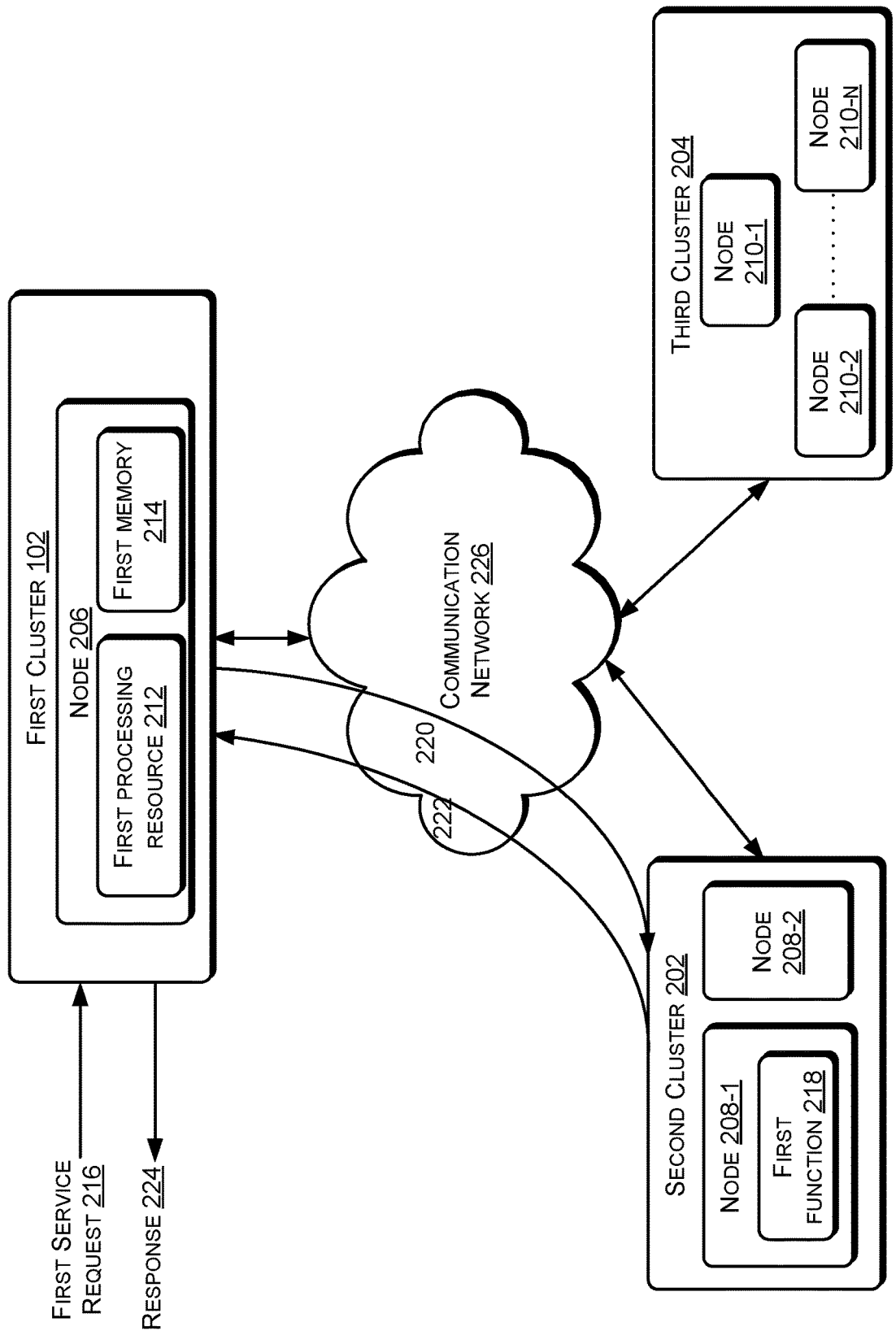
FIG. 2 illustrates a plurality of clusters that may execute functions, according to an example implementation of the present subject matter.

FIG. 2 illustrates a plurality of clusters that may execute functions, according to an example implementation of the present subject matter. In an example, the plurality of clusters may be a part of the system 100. The plurality of clusters may include the first cluster 102, a second cluster 202, and a third cluster 204.

Each cluster may include a node. For instance, the first cluster 102 includes a node 206, the second cluster 202 may include two nodes 208-1 and 208-2, and the third cluster 204 may include 'n' nodes, 210-1, 210-2, 210-n. As mentioned earlier, each node may be a physical node or a virtual node. Further, each node may include a processing resource and a memory. For instance, the node 206 includes a first processing resource 212 and a first memory 214.

In an example, a processing resource may be implemented as a microprocessor, a microcomputer, a microcontroller, a digital signal processor, a central processing unit, a state machine, a logic circuitry, and/or any device that manipulates signals based on operational instructions. Among other capabilities, the processing resource may fetch and execute computer-readable instructions included in a memory. The functions of the processing resource may be provided through the use of dedicated hardware as well as hardware capable of executing machine-readable instructions.

A memory may include any non-transitory computer-readable medium including volatile memory (e.g., RAM), and/or non-volatile memory (e.g., EPROM, flash memory, Memristor, etc.). The memory may also be an external memory unit, such as a flash drive, a compact disk drive, an external hard disk drive, or the like.

In an example, if a node is a virtual node implemented on a computing device, the processing resource and the memory to be allocated to the node may be carved from that of the processing resource and the memory, respectively, of the computing device. Further, as explained earlier, the processing resource of nodes of a cluster may be pooled and managed together. Similarly, the memory of nodes of a cluster may be pooled and managed together.

A node in a cluster may execute functions. Example functions include a function that computes Fibonacci numbers, a function that computes simple moving average, and a function that classifies an input image as being fit or unfit for viewing by children.

In an example, a function may be executed in a container hosted in a node of a cluster. A container may be a computing instance that can host and execute a function and can operate as a separate computing device from the point of view of the function. For instance, the container can isolate the function running in the container from a computing device the container is hosted in and from other containers hosted in the computing device. The containers of a cluster may be managed by an orchestration platform, which is used for automating deployment, scaling, and management of containerized functions. The container orchestrator may be, for example, Kubernetes®.

In an example, each cluster may be operating a serverless computing environment. In such a case, a cluster may receive a function that is part of an application code from a developer of the application for execution. Further, a container hosting the function may be instantiated in a node of a cluster when the function is to be executed and may be terminated when the output of the execution is completed. The function, being operated in the serverless computing environment, may be referred to as a serverless function. In the below description, the terms "serverless functions" and "functions" are used interchangeably. The serverless computing environment of each cluster may be managed by a serverless framework, such as Kubeless®.

A service request corresponding to a function may be serviced by executing the function. For instance, a service request for the function that classifies an input image as being fit or unfit for viewing by children may include an input image that is to be classified as being fit/unfit. The service request may be received, for example, from a user. In another example, the service request for a function may be a function call received from a program, a script, or the like.

The service request for a function may be received at a cluster that hosts the function. For instance, a first service request 216 for a first function 218 may be received at an Internet Protocol (IP) address of the first cluster 102. The first cluster 102 may attempt to handle the first service request 216 by instantiating a container that is to execute the first function 218. However, in some cases, the first cluster 102 may be unable to handle the first service request 216 due to unavailability of resources. For instance, the memory resources, the storage resources, and processing power of the first cluster 102 may be utilized for executing functions corresponding to previously-received service requests. In case a function corresponding to a service request cannot be executed by a cluster, to prevent turning down the service request and to comply with a service level agreement (SLA) with the user, the cluster may utilize resources of another cluster, as will be explained below:

A plurality of clusters may form a community of clusters, also referred to as a community. A cluster of the community may execute a function corresponding to a service request received by another cluster of the community. The execution of a function by one cluster for handling a service request received by another cluster may be referred to as sharing of workload between the clusters. The sharing of workload may be performed if the cluster that received the service request does not have resources to handle the service request. For instance, the community may include the first cluster 102 and the second cluster 202. When the first cluster 102 receives the first service request 216 and does not have the resources to execute the first function 218, the first cluster 102 may determine whether the second cluster 202 has resources available to execute the first function 218. If the second cluster 202 has available resources, the first cluster 102 may request the second cluster 202 to execute the first function 218. The sending of the request is represented by the arrow 220.

In an example, the first cluster 102 may request the second cluster 202 to confirm if the second cluster 202 has the first function 218 stored in it. If, based on a response from the second cluster 202, the first cluster 102 determines that the second cluster 202 does not have the first function 218, the first function 218 or a container image having the first function 218 may be sent to the second cluster 202 for storage and execution. Accordingly, the arrow 220 may also represent sending of the first function 218 by the first cluster 102 to the second cluster 202.

Subsequently, the second cluster 202 may execute the first function 218. The execution may be performed in a container (not shown in FIG. 2) hosted in a node, such as the node 208-1. In case of a serverless computing environment, to execute the first function 218, the second cluster 202 may instantiate a container in the node and execute the first function 218 in the node. Upon execution of the function and generation of the result, the container may be terminated. The result of the execution may then be returned to the first cluster 102, as represented by the arrow 222. The first cluster 102 may then utilize the result for providing a response 224 to the first service request 216.

The exchange of information between clusters of the community may be performed over a communication network 226. The communication network 226 may be a wireless or a wired network, or a combination thereof. The communication network 226 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 226 may include various network entities, such as transceivers, gateways, and routers.

In addition to the first cluster 102 and the second cluster 202, the community may also include the third cluster 204. Accordingly, the third cluster 204 may also be utilized to execute functions corresponding to service requests received by the first cluster 102 or the second cluster 202 if the first cluster 102 or the second cluster 202 does not have the resources for handling their respective service requests. Similarly, the third cluster 204 may request the first cluster 102 or the second cluster 202 to execute a function corresponding to a service request it received.

In an example, the clusters that form a community may belong, for example, to different departments of an organization, a university, or the like. For instance, the first cluster 102 may belong to the sales department, the second cluster 202 may belong to the design department, and the third cluster 204 may belong to the human resources department of an organization. In another example, the different clusters of the community may belong to different geographical regions of a multi-national or a multi-regional organization. In other examples, the clusters that form the community may be related to each other in terms of other criteria or may be unrelated. As such, clusters belonging to different entities that want to act in a collaborative manner to handle their respective workloads may form a community. The decision to join a cluster to the community may be performed, for example, by the entity that manages or owns the cluster. The clusters that are part of the community may be of various sizes, include different number of computing nodes, and with different amount of resources available. Further, the clusters may be distributed geographically as well.

As discussed above, a cluster that originally received a service request attempts to handle the service request on its own, and requests another cluster of the community in case of resource unavailability. Thus, the manner in which a service request is handled is controlled by the cluster that originally received the service request. Such autonomy of the clusters facilitates collaboration among clusters owned by different entities, such as different departments. Also, the involvement of a centralized scheduler for allocation of service requests is avoided.

Further, even though a cluster may generate a result of execution of the function on behalf of another cluster, the result is returned to the cluster that originally received the service request for responding to the service request. Accordingly, a user who provides the service request remains oblivious to the sharing of workload. Hence, the user does not have to interact with multiple clusters for receiving the result of the execution. For instance, a user from the accounts department may continue to send the service requests to a cluster earmarked to the accounts department and receive responses from the same cluster. In an example, a community manager may help to manage sharing of workloads between cluster.

Figure 3:
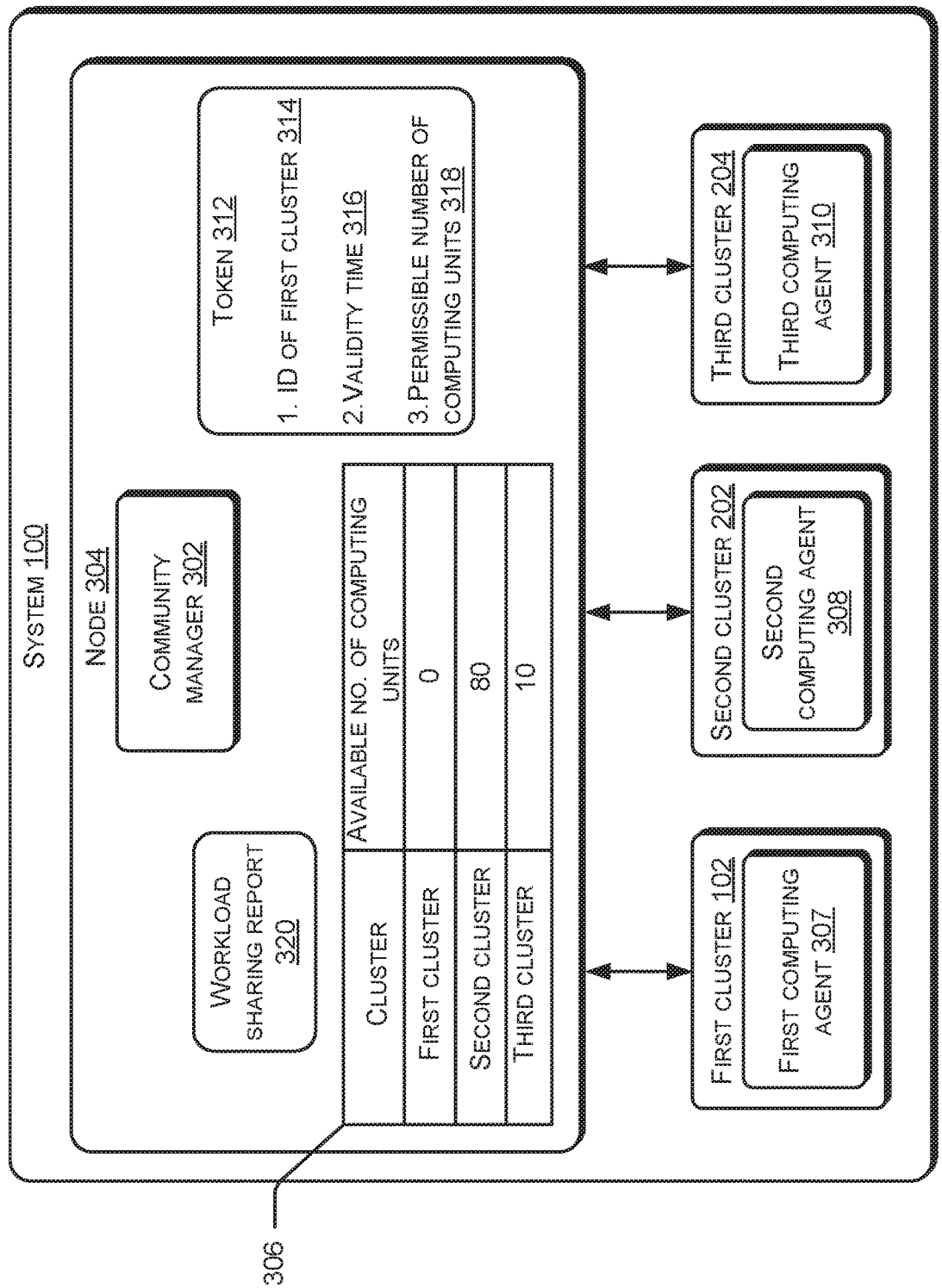
FIG. 3 illustrates a system having a community manager to manage a community of clusters, according to an example implementation of the present subject matter.

FIG. 3 illustrates the system 100 having a community manager 302 to manage the community, according to an example implementation of the present subject matter. The community manager 302 may be implemented by executing a set of machine-readable instructions stored in a memory by a processing resource. The processing resource and the memory may be part of a node 304 of the system 100. In an example, the community manager 302 may be implemented as a service hosted in a container (not shown in FIG. 3) in the node 304. In another example, the community manager 302 may be implemented as a plurality of services, where each service is involved in performance of one or more of the operations of the community manager 302 explained below. Each such service may be implemented in a container in a node of the system 100. The community manager 302 may be running in a centralized Software-as-a-Service (Sans) portal.

The community manager 302 may aid in formation and management of the community. A cluster that is to join the community may send a registration request to the community manager 302. The registration request may include an endpoint of the cluster, which can be used to communicate with the cluster. Based on the registration request, the community manager 302 may add the requesting cluster to the community and update a list of clusters in the community. Further, the community manager 302 may utilize a messaging service to send and receive messages among clusters of the community and between the clusters and the community manager 302. The messaging service may be, for example, Amazon™ SNS™ (Simple Notification Service), Amazon™ SQS™ (Simple Queue Service), Kafka®, or the like.

The community manager 302 may manage the sharing of workload between the clusters of the community by allowing a cluster that does not have available resources to identify a cluster with which it can share its workload. For instance, the first cluster 102 may approach the community manager 302 with an identification request to identify a lender cluster, i.e., the cluster that has resources available for executing a function. In response to the identification request, the community manager 302 may identify that the second cluster 202 has resources available and may indicate to the first cluster 102 that the second cluster 202 is identified as the lender cluster.

To facilitate sharing of the workload, in an example, the community manager 302 may monitor resources available with each cluster of the community and may store such information as a record 306. The information of resources available with a cluster may be referred to as resource availability information of the cluster. The resource availability information may be published by each cluster to the community manager 302. To facilitate publication of the resource availability information to the community manager 302, in an example, each cluster of the community may utilize a computing agent. The computing agents of the first cluster 102, the second cluster 202, and the third cluster 204 may be referred to as a first computing agent 307, a second computing agent 308, and a third computing agent 310, respectively. The computing agent may be implemented in a cluster by executing a set of instructions stored in a memory of the cluster by a processing resource (not shown in FIG. 3) of the cluster. The computing agent may be implemented in a cluster upon addition of the cluster to the community by the community manager 302.

To determine the resource availability information, a cluster, such as the first cluster 102, may forecast its resource consumption for a predetermined future time duration, such as one hour. The forecast may be performed, for example, by the computing agent of the cluster, such as the first computing agent 307. Such a forecast may be performed based on an analysis of a historical workload pattern of the cluster. In an example, the forecast may utilize machine learning. Here, historical workload pattern may include a pattern in which service requests are received by the cluster and a pattern in which resources of the cluster are consumed to handle the service requests. Based on the forecasted resource consumption, the cluster may also forecast its resource availability in the predetermined future time duration. Subsequently, the resource availability information may be provided to the community manager 302. The resource availability information may then be published by the community manager 302, for example, to other clusters.

It may be noted that a cluster attempts to ensure that it has resources available for handling service requests it expects to receive and makes the remaining resources available for sharing of workloads. Thus, the present subject matter promotes localized handling of service requests while utilizing sharing of workloads at times of resource unavailability.

In an example, the resource availability information may be published in terms of a standard unit of resource consumption, such as five minutes of computing power of an arbitrary computing node. The standard unit may be agreed upon between the clusters of the community and may be referred to as a computing unit. If each computing unit refers to five minutes of computing power, and if the second cluster 202 indicates that it has 80 computing units available, the community manager 302 may determine that the second cluster 202 can simultaneously perform 80 tasks, each of which consumes five minutes of computing power. Accordingly, if the second cluster 202 publishes its resource availability information as 80 computing units for a period of 1 hour, it may be deduced that the second cluster can perform 12 batches of 80 tasks, each of which consumes five minutes of computing power.

In an example, the first cluster 102, which is to request another cluster to execute the first function 218, may quantify an amount of resources that is to be spared by the other cluster. Such a quantification may also be in terms of computing units, To quantify the amount of resources in terms of computing units, the first cluster 102 may determine a number of computing units to be expended to execute the first function 218, The number of computing units to be expended may be determined, for example, based on a previous execution of the first function 218 or based on an input from the user providing the service request. It may be understood that the first function 218 may include sub-functions or may make function calls to other functions. Accordingly, the resources to be expended in executing the first function 218 may include resources expended in executing the sub-functions and/or the functions that are called.

Subsequently, when the first cluster 102 sends the identification request to the community manager 302 to identify a cluster that can execute first function 218, the first cluster 102 may also specify the number of computing units to be expended to execute the first function 218. The number of computing units specified by the first cluster 102 may be referred to as the first number of computing units.

The community manager 302 may receive the identification request and compare the first number of computing units (which is specified in the identification request) with the resource availability information in the record 306, If the community manager 302 identifies that the second cluster 202 can spare the first number of computing units, the community manager 302 may indicate to the first cluster 102 that the second cluster 202 can share the workload. In addition, the community manager 302 may establish a borrower-lender relationship between the borrower, i.e., the first cluster 102, and the lender, i.e., the second cluster 202.

In an example, instead of identifying a cluster that can share the workload of the first cluster 102, the community manager 302 may share the resource availability information of other clusters of the community with the first cluster 102. Based on the resource availability information of other clusters, the first cluster 102 may identify a cluster that can share the workload.

In an example, the community manager 302 may help establish a secure borrower-lender relationship between the first cluster 102 and the second cluster 202. The establishment of the secure borrower-lender relationship may involve utilization of a token 312. The token 312 may be generated by the community manager 302, for example, upon identification of the lender cluster. Further, in an example, the token 312 may be provided to the first cluster 102, for example, in response to the identification request from the first cluster 102. For instance, the community manager 302 may provide the token 312 along with the indication of the lender cluster.

The first cluster 102 may present the token 312 to the second cluster 202 along with the request to share the workload. In another example, instead of providing to the token to the first cluster 102, the community manager 302 may provide the token 312 to the second cluster 202 upon identification of the second cluster 202 as the lender cluster. In a further example, the token 312 may be provided to both the first cluster 102 and the second cluster 202.

The token 312 may include information that can be used by the second cluster 202 to verify the authenticity of the request from the first cluster 102 to share the workload. For instance, the token 312 may include an identifier (not shown in FIG. 3) unique to the community. Using such an identifier, the second cluster 202 may verify if the request is coming from a member of the community. Such an identifier may be changed periodically to ensure that an external entity that obtained the identifier does not continue to exploit the community for a prolonged period of time.

The token 312 may also include an identifier 314 of the first cluster 102. Once the token 312 is received from the first cluster 102, the second cluster 202 may verify whether the identifier 314 in the token 312 corresponds to the first cluster 102. A successful verification may indicate that the first cluster 102 is authorized by the community manager 302 to request the second cluster 202.

In an example, the token 312 may be an aged token, i.e., may be valid for a certain period of time and may become invalid thereafter. To indicate the period for which the token 312 is valid, the token 312 may specify a validity time 316. Upon expiry of the validity time 316, the token 312 cannot be used to establish a borrower-lender relationship between the first cluster 102 and the second cluster 202. For instance, upon expiry of the validity time 316, if the first cluster 102 requests the second cluster 202 to share the workload and presents the token 312, the second cluster 202 may refuse to share the workload, and does not execute functions as requested by the first cluster 102. The specification of the validity time 316 in the token 312 prevents the first cluster 102 from burdening the second cluster 202 with its requests for a prolonged period of time, which may happen if security of the first cluster 102 is compromised and an external entity is trying to take advantage of resources of clusters of the community.

In an example, the token 312 may specify a permissible number of computing units 318 for which the token 312 can be used. The permissible number of computing units 318 may indicate the maximum number of computing units that the first cluster 102 can request from the second cluster 202 for execution of function. Upon receiving the request from the first cluster 102, which may specify the first number of computing units, the second cluster 202 may compare the first number with the permissible number of computing units 318, which is specified in the token 312. If the number specified is less than or equal to the permissible number 318, the second cluster 202 may accept the request and may execute the function as per the request. If the number specified is more than the permissible number 318, the second cluster 202 may turn down the request. The permissible number 318 may be specified in the token 312 by the community manager 302 based on the identification request from the first cluster 102, which may specify the first number of computing units. The specification of the permissible number 318 in the token 312 prevents the first cluster 102 from exploiting the second cluster 202 by making the second cluster 202 to expend additional resources. In an example, the community manager 302 may refuse to provide a token to the first cluster 102 if the first cluster 102 requests for tokens frequently.

The token of the present subject matter facilitates establishing secure and trusted borrower-lender relationships between clusters of a community. Further, the token prevents exploitation of the clusters by external entities by taking unauthorized control of one of the clusters.

In an example, the community manager 302 may generate a workload sharing report 320 providing information pertaining to workload sharing among clusters of the community over a period of time. The workload sharing report 320 may indicate, for example, the number of computing units spared by each cluster of the community for executing functions for other clusters, the number of computing units borrowed by each cluster, a trend of computing units that were unused in each cluster and in the community, and latency in handling service requests due to cross-cluster communication. The workload sharing report 320 may provide meaningful insights regarding performance of the clusters.

In the above examples, the sharing of the workload is explained with reference to a single lender cluster (i.e., the second cluster 202). In some cases, more than one cluster may have the requested computing units. In such cases, selection of a lender cluster is to be performed. The selection of lender cluster and distribution of workloads among the lender clusters will be explained with reference to FIG. 4

Further, although the first cluster 102 is explained as sending an identification request for each service request received, in some cases, the first cluster 102 may aggregate multiple service requests received over a period of time and may send one identification request corresponding to the multiple service requests. For instance, the first cluster 102 may send one identification request corresponding to the first service request 216 and a second service request. In such a case, the number of computing units specified in the identification request may be the number of computing units to be spared for execution of functions corresponding to the multiple service requests. For instance, if one identification request is sent for the first service request 216 and a second service request, such an identification request may specify 'X' number of computing units which may be a sum of the first number of computing units and a second number of computing units. Here, the second number of computing units may be the number of computing units to be spared for a second function (not shown in FIG. 2) corresponding to the second service request. The selection of lender clusters for execution of the different functions will be explained with reference to FIG. 4.

Figure 4:
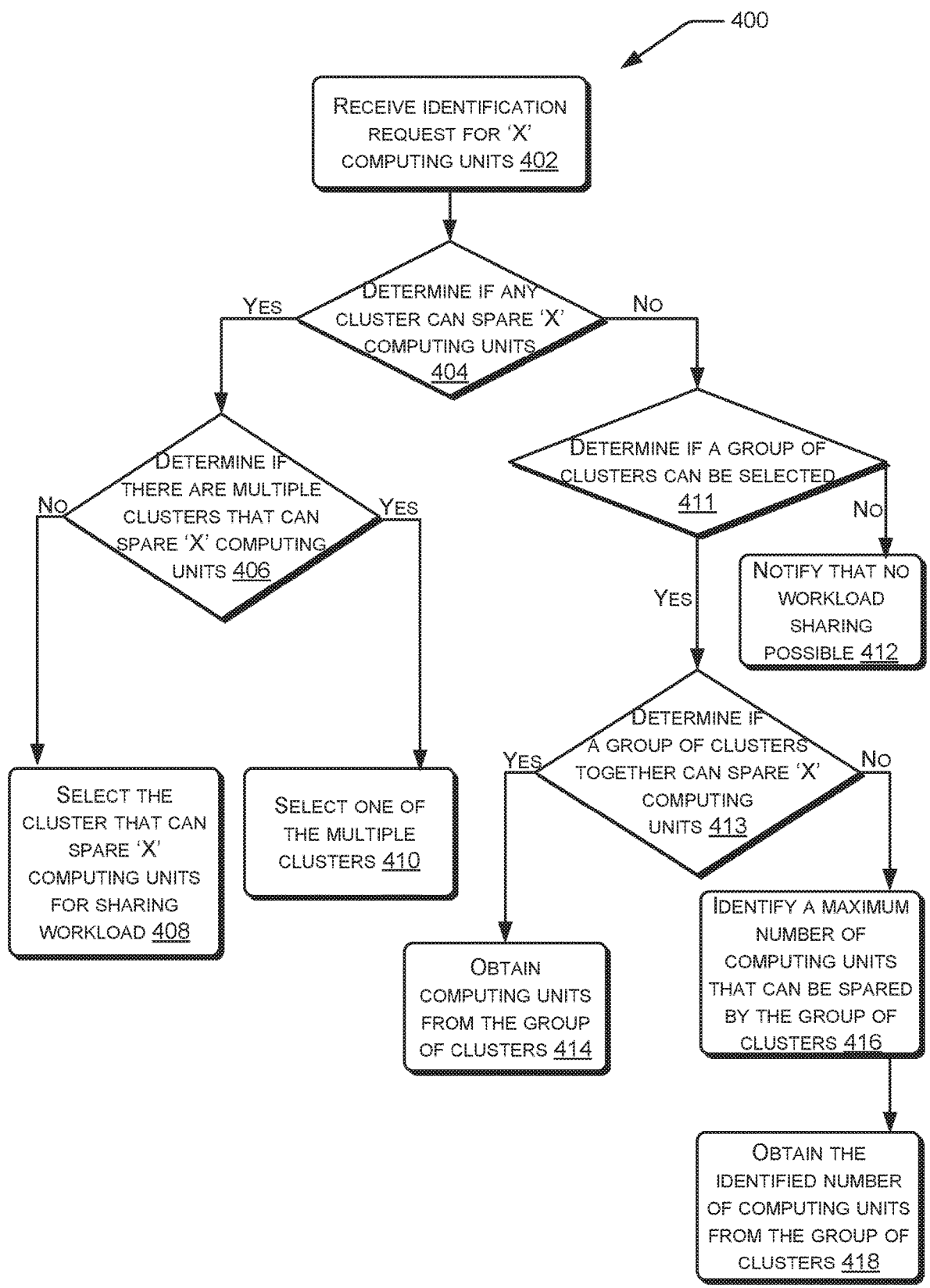
FIG. 4 illustrates a method for selection of lender cluster, according to an example implementation of the present subject matter.

FIG. 4 illustrates a method 400 for selection of lender cluster, according to an example implementation of the present subject matter. The order in which the method 400 is described is not intended to be construed as a limitation, and any number of the described method blocks may be combined in any order to implement the method 400, or an alternative method. The method 400 may be performed, for example, by the community manager 302.

At block 402, an identification request may be received from a requesting cluster, such as the first cluster 102. The identification request may be for identification of a cluster that can spare 'X' number of computing units. Here, 'X' may be the first number if the identification request corresponds to the first service request 216 alone. 'X' may be greater than the first number (e.g., a sum of the first number and the second number) if the identification request corresponds to more than one service request, as explained above.

In response to the request, at block 404, clusters of the community that can spare the 'X' number of computing units may be identified. Such an identification may be performed based on the resource availability information published by each cluster, as explained earlier.

At block 406, it is determined if more than one cluster can spare the 'X' number of computing units. For instance, it may be checked whether both the second cluster 202 and the third cluster 204 can spare the 'X' number of computing units requested for by the first cluster 102. If it is identified that a single cluster alone can spare the 'X' number of computing units, at block 408, such a cluster may be selected as the lender cluster. Further, an indication of the lender cluster may be provided to the requesting cluster. If, at block 406, it is identified that multiple clusters can spare the 'X' number of computing units, at block 410, one cluster is selected from among the multiple clusters. The selection at block 410 may be performed based on a selection criterion. The selection criterion may be, for example, network latency. For instance, a cluster that offers the smallest latency for communication with the requesting cluster may be selected as the lender cluster. In another example, the selection criterion may be proximity of a cluster with the requesting cluster. For instance, the cluster that is closest to the requesting cluster may be selected as the lender cluster. The proximity may be indicative of the network latency that may be expected. In a further example, the selection criterion may be the number of computing units available with a cluster. For instance, if both the second cluster 202 and the third cluster 204 can spare the 'X' number of computing units, a cluster having a higher number of available computing units may be selected as the lender cluster. Alternatively, a cluster having a lesser number of available computing units may be selected as the lender cluster. In an example, multiple selection criteria may be utilized to select the lender cluster.

If, at block 404, it is determined that there is no single cluster that can spare the 'X' number of computing units, at block 411, it is determined if computing units can be obtained from a group of clusters. The computing units can be obtained from a group of clusters if, for example, the computing units are for executing multiple functions, each corresponding to a different service request. For instance, if 'X' number of computing units is a sum of the first number of computing units and the second number of computing units, the first number of computing units may be obtained from the second cluster 202 and the second number of computing units may be obtained from the third cluster 204. If it is not possible to obtain the computing units from the group of clusters, at block 412, the selection process ends, and the first cluster 102 is notified that workload sharing is not possible.

If it is possible to obtain the computing units from a group of clusters, at block 413, it is determined if more than one cluster can collectively spare the 'X' number of computing units. For instance, it may be checked if the first number of computing units can be spared by the second cluster 202 and the second number of computing units can be spared by the third cluster 204 or vice versa. If yes, at block 414, the clusters from which the computing units are to be obtained may be selected and computing units may be obtained. The selection of clusters may be performed based on, for example, the number of computing units available with each cluster and the network latency offered by each cluster for communication with the requesting cluster. For instance, if multiple clusters can spare the first number of computing units, one of those clusters may be selected based on the number of computing units available with the clusters and the network latency offered by those clusters.

At block 413, if it is determined that a group of clusters cannot collectively spare the 'X' number of computing units, at block 416, a maximum number of computing units that can be obtained from the clusters of the community is identified. The maximum number would be less than 'X' and may be, for example, the first number or the second number. Further, a cluster that is to spare the maximum number of computing units may be selected if more than one cluster can spare the maximum number of computing units. The selection may be based on, for example, the number of computing units available with the clusters and the network latency offered by the clusters for communication with the requesting cluster. Based on the identification, at block 418, the maximum number of computing units may be obtained from the selected cluster. In this manner, a maximum possible number of service requests are handled. For instance, even if both the first service request 216 and the second service request cannot be handled, one of the two service requests may be handled by utilizing available resources from other clusters of the community.

The selection of lender clusters and determination of the number of computing units to be spared by lender clusters based on various criteria, such as available computing units with each cluster and network latency, ensures that the service requests are handled to the maximum extent possible in the shortest possible time.

Although, in the above examples, it is explained that the resource availability information and the identification request specify the number of computing units, in some cases, the resources to be spared and resource availability may be quantified in terms of the function to be executed. For instance, the identification request from the first cluster 102 may indicate that two instances of function 'A' are to be executed (e.g., to handle two service requests). Further, the second cluster 202 may indicate that it has resources to execute 5 instances of function 'A'. The quantification in terms of the function may be performed if the clusters of the community are aware of the amount of resources to be expended to execute a function. In another example, the quantification may be in terms of amount of time that is to be expended for executing the function by an arbitrary computing node.

As will be understood, any manner of quantification that can provide a measure of the resources available and resources to be expended may be agreed upon by the clusters of the community and can be utilized for workload sharing. Based on the manner of quantification, the information in the token 312 may also vary. For instance, if the quantification is in terms of the amount of time that is to be expended for executing the function, the token 312 may specify a permissible amount of time. If the lender cluster determines that execution of function for the borrower cluster may consume more time than that the permissible amount of time, the lender cluster may turn down the request of the borrower cluster to execute the function. Accordingly, the token 312 may be utilized for establishing a secure borrower-lender relationship between the first cluster 102 and the second cluster 202 for various types of quantification.

Figure 5:
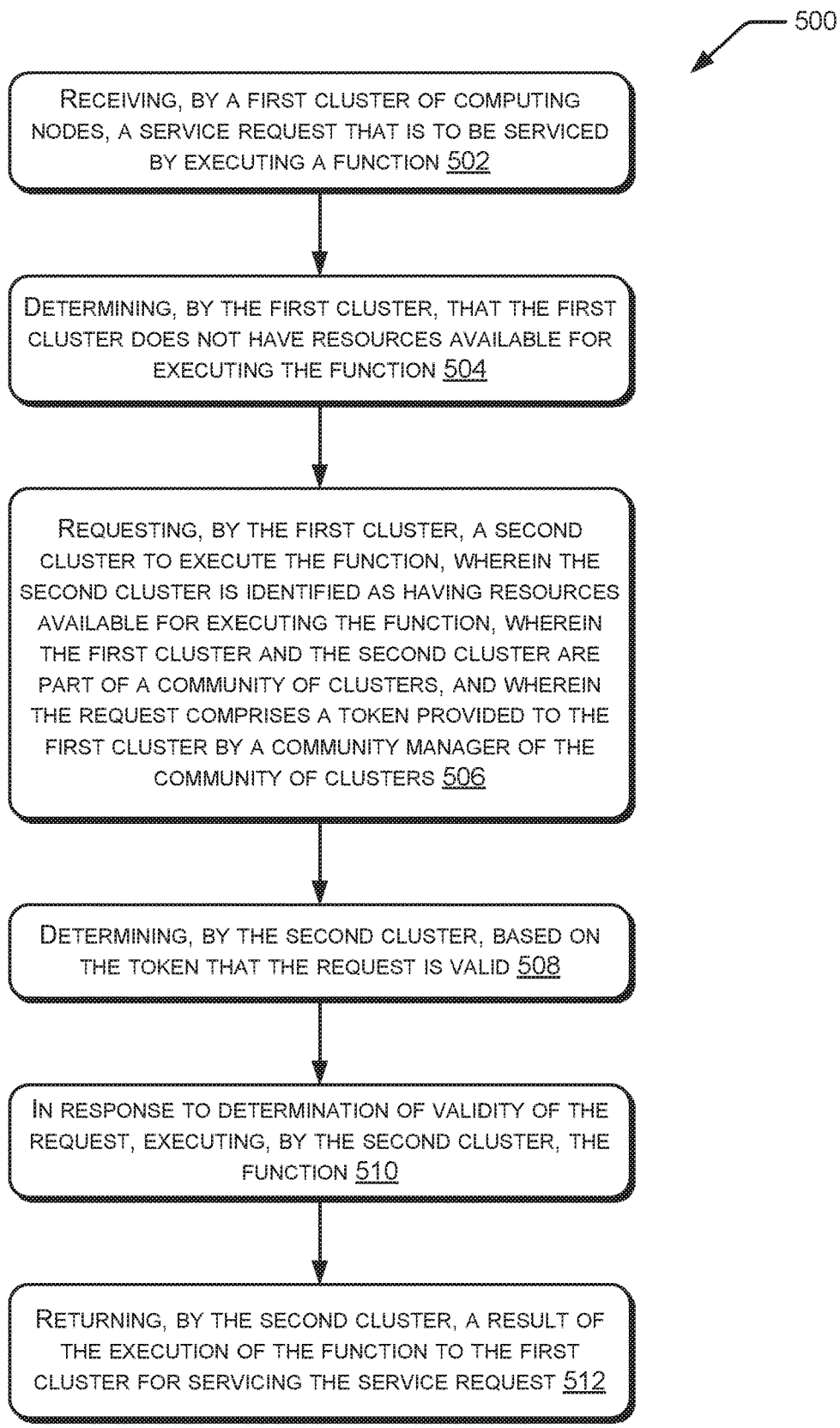
FIG. 5 illustrates a method for facilitating execution of programming functions by clusters of computing nodes, according to an example implementation of the present subject matter.
Figure 6:
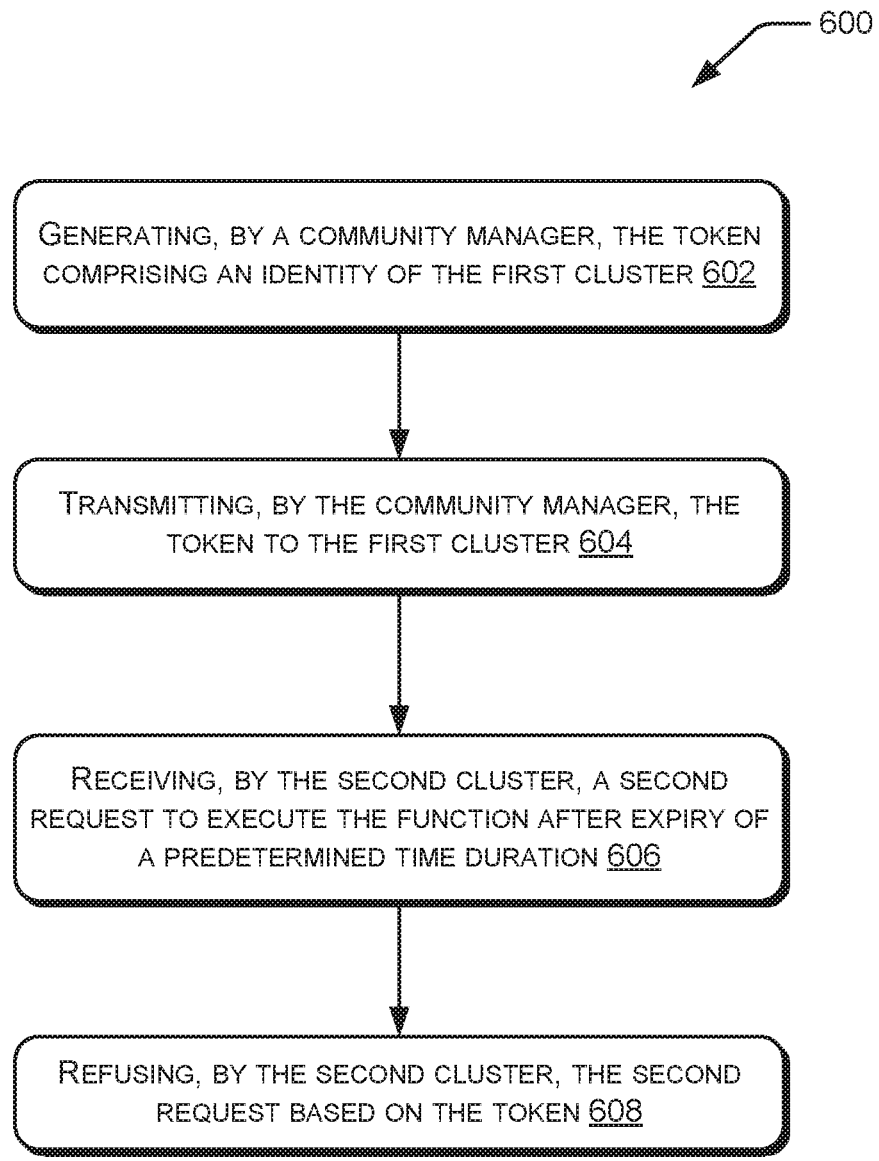
FIG. 6 illustrates a method for utilizing a token to determine whether to execute a function in response to a request, according to an example implementation of the present subject matter.

FIGS. 5 and 6 illustrate methods 500 and 600 respectively for facilitating execution of programming functions by clusters of computing nodes, according to example implementations of the present subject matter. The order in which the methods 500 and 600 is described is not intended to be construed as a limitation, and any number of the described method blocks may be combined in any order to implement the methods 500 and 600, or alternative methods. Furthermore, the methods 500 and 600 may be implemented by processing resource(s) or computing device(s) through any suitable hardware, non-transitory machine-readable instructions, or a combination thereof.

It may be understood that steps of the methods 500 and 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Further, although the methods 500 and 600 may be implemented in a variety of systems, the methods 500 and 600 are described in relation to the system 100, for ease of explanation.

Referring to method 500, at block 502, a first cluster of computing nodes, interchangeably referred to as a first cluster, may receive a service request that is to be serviced by executing a function. In an example, the first cluster may be the first cluster 102, the service request may be the first service request 216, and the function may be the first function 218.

At block 504, the first cluster may determine that it does not have resources available for executing the function. At block 506, the first cluster may request a second cluster to execute the function. The second cluster may be, for example, the second cluster 202. The first cluster and the second cluster may be part of a community of clusters and the second cluster may have been identified as having resources available for executing the function.

In an example, the first cluster may determine that the second cluster has available resources based on resource availability information of each cluster of the community. The resource availability information of the clusters may be published to the first cluster by a community manager, such as the community manager 302.

The community manager may register the second cluster to the community in response to receiving a registration request from the second cluster. Subsequently, the community manager may start receiving resource availability information of the second cluster and publish the same, for example, to the first cluster.

In an example, in addition to the first cluster and the second cluster, the community may include a third cluster, such as the third cluster 204. If the first cluster determines that both the second cluster and the third cluster have the available resources, the first cluster may select the second cluster as a lender cluster, i.e., the cluster to which the request is to be sent, based on respective proximities of the second cluster and the third cluster with the first cluster. For instance, the second cluster may be selected as the lender cluster if the proximity between the second cluster and the first cluster is more as compared to that between the third cluster and the first cluster. Although the selection of the lender cluster based on the resource availability information is explained as being performed by the first cluster, in an example, the selection may be performed by the community manager, as explained with reference to FIG. 3.

In an example, the request from the first cluster to the second cluster may include a token provided to the first cluster by the community manager of the community of clusters. The token may be, for example, the token 312.

At block 508, the second cluster may determine that the request is valid based on the token. For instance, as explained with reference to FIG. 3, the token may include information, such as the identifier unique to the community and the identifier of the first cluster, based on which the second cluster may verify the authenticity of the request from the first cluster.

At block 510, the second cluster may execute the function in response to determination of validity of the request from the first cluster. Further, at block 512, the second cluster may return a result of the execution of the function to the first cluster for handling the service request.

In an example, the token may be valid for a predetermined time duration. For instance, the token may include a validity time, as explained earlier, beyond which the token cannot be utilized to request the second cluster. The utilization of the token to decide whether to execute a function will be explained with reference to FIG. 6.

In an example, the method 500 may include determining, by the first cluster, whether the second cluster has the function. In response to a determination that the second cluster does not have the function, the first cluster may transmit the function to the second cluster, as explained with reference to the arrow 220.

FIG. 6 illustrates a method 600 for utilizing the token to determine whether to execute a function in response to a request, according to an example implementation of the present subject matter. At block 602, the token may be generated by the community manager. Subsequently, at block 604, the token may be transmitted to the first cluster. The generation and transmission of the token may be performed, for example, after receiving an identification request from the first cluster.

At block 606, the second cluster may receive a second request to execute the function. The second request may be received after expiry of a predetermined time duration specified in the token. Accordingly, at block 608, the second cluster may refuse the second request based on the token.

Figure 7:
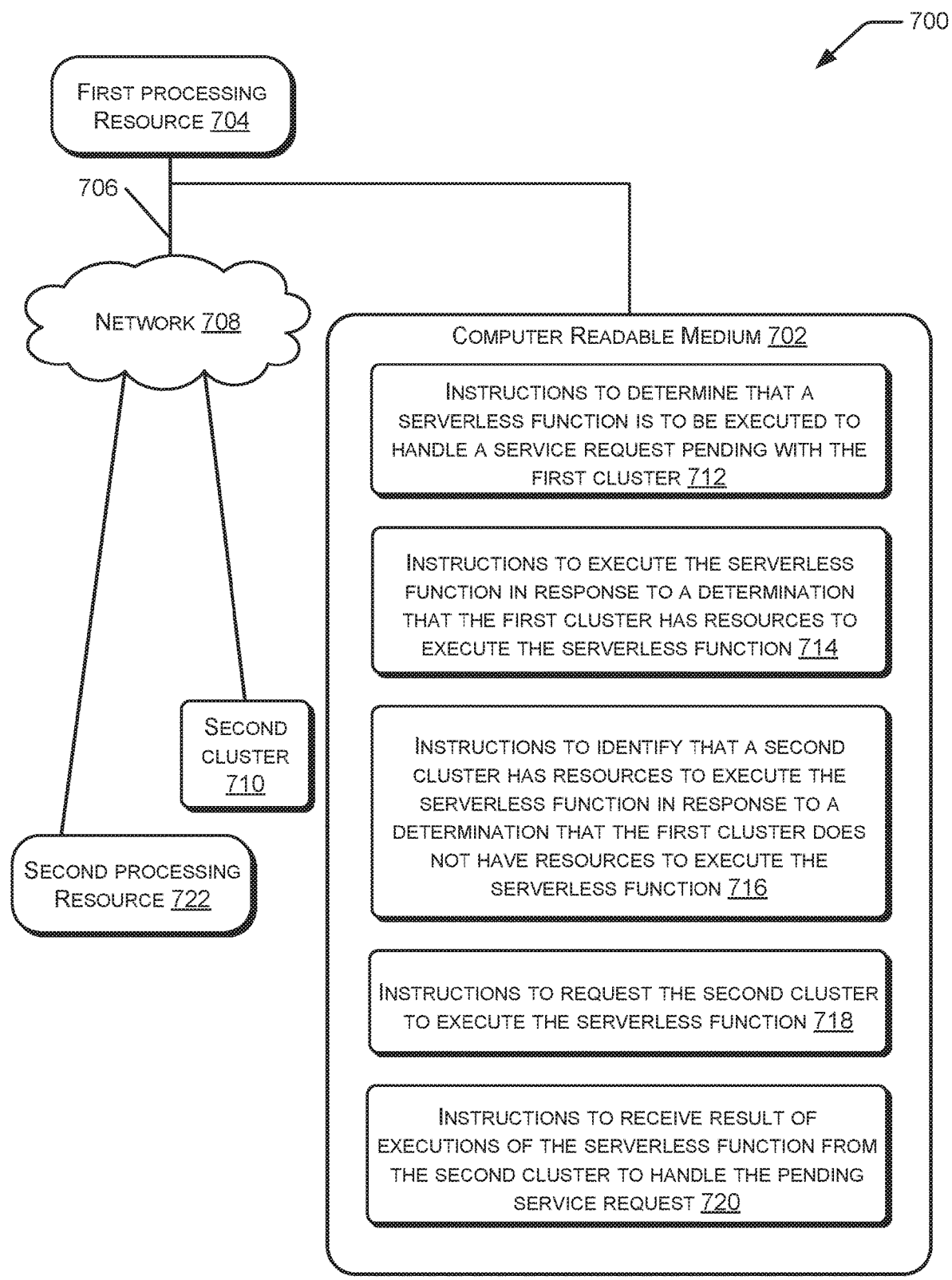
FIG. 7 illustrates a computing environment implementing a non-transitory computer-readable medium for facilitating execution of programming functions by clusters of computing nodes, according to an example implementation of the present subject matter.

FIG. 7 illustrates a computing environment 700 implementing a non-transitory computer-readable medium 702 for facilitating execution of programming functions by clusters of computing nodes, according to an example implementation of the present subject matter. In an example, the non-transitory computer-readable medium 702 may be utilized by a system, such as the system 100. In an example, non-transitory computer-readable medium 702 may be utilized by a first cluster of computing nodes, such as the first cluster 102, of the system. In an example, the computing environment 700 may include a first processing resource 704 communicatively coupled to the non-transitory computer-readable medium 702 through a communication link 706.

In an example, the first processing resource 704 may be a processing resource of the first cluster. For instance, the first processing resource 704 may be the first processing resource 212. The non-transitory computer-readable medium 702 may be, for example, an internal memory device or an external memory device. In an example, the communication link 706 may be a direct communication link, such as any memory read/write interface. In another example, the communication link 706 may be an indirect communication link, such as a network interface. In such a case, the first processing resource 704 may access the non-transitory computer-readable medium 702 through a network 708. The network 708 may be a single network or a combination of multiple networks and may use a variety of different communication protocols.

The first processing resource 704 and the non-transitory computer-readable medium 702 may also be communicatively coupled to a second cluster 710 over the network 708. The second cluster 710 and the first cluster may be part of a community of clusters, also referred to as a cluster community or a community. The second cluster may be, for example, the second cluster 202. The first cluster and the second cluster may execute functions in a serverless computing environment. The functions may be referred to as serverless functions.

In an example implementation, the non-transitory computer-readable medium 702 includes a set of computer-readable instructions to facilitate execution of serverless functions by clusters of computing nodes, also referred to as a cluster. The set of computer-readable instructions can be accessed by the first processing resource 704 through the communication link 706 and subsequently executed.

Referring to FIG. 7, in an example, the non-transitory computer-readable medium 702 includes instructions 712 that cause the first processing resource 704 to determine that a serverless function is to be executed to handle a service request pending with the first cluster. The pending service request may be, for example, the first service request 216 and the serverless function may be the first function 218. The non-transitory computer-readable medium 702 includes instructions 714 to execute the serverless function in response to a determination that the first cluster has resources to execute the serverless function.

In response to a determination that the first cluster does not have resources to execute the serverless function, instructions 716 facilitate identification that the second cluster 710 has resources to execute the serverless function. Instructions 718 are executable to request the second cluster to execute the serverless function. Further, instructions 720 are executable to receive result of execution of the serverless function from the second cluster to handle the pending service request.

In an example, the non-transitory computer-readable medium 702 may include a second set of instructions executable by a second processing resource 722 to implement a community manager, such as the community manager 302. The second processing resource 722 may be connected to the first cluster and the second cluster 710 through the network 708. The second set of instructions may be executed to track computing resources expended by the second cluster 710 for handling service requests received by the first cluster. Such a tracking may facilitate generation of a workload sharing report, such as the workload sharing report 320, providing information pertaining to workload sharing among clusters of the community over a period of time.

In an example, the second set of instructions are executable to monitor resource availability information published by each cluster of the cluster community and to provide the resource availability information published by each cluster as an input to the first cluster. Based on the input, the second cluster may be identified as having the resources to execute the serverless function. The resource availability information of a cluster may be monitored upon registration of the cluster with the community manager, as explained earlier.

In an example, the second set of instructions are executable to generate a token usable by the second cluster to authenticate the first cluster. The token may be, for example, the token 312. The token may be transmitted to the first cluster, the second cluster, or both. The token may specify an estimated amount of time that the execution of the serverless function is to consume. The estimated amount of time may be determined by the first processing resource 704. The estimated amount of time may provide an idea regarding the amount of resources to be expended by the second cluster to execute the serverless function, as explained earlier.

The present subject matter improves handling of service requests by clusters of computing nodes. For instance, a cluster burdened with a high number of service requests may request another cluster with available resources to execute functions corresponding to at least some of the service requests. Thus, the burdened cluster may be prevented from turning down service requests and from failing. Therefore, the overall performance of the clusters is improved. The present subject matter also prevents increasing size of a cluster for handling transient increase in the number of service requests.

Further, the token of the present subject matter facilitates establishing secure and trusted borrower-lender relationships between clusters of a community. Further, the token prevents exploitation of the clusters by external entities by taking unauthorized control of one of the clusters.

The present subject matter can be utilized by clusters that operate a serverless computing environment. Since functions are executed on-demand in ephemeral containers, a cluster experiencing a sudden increase in the number of incoming service requests may request another cluster of the community to execute some or all of the functions to handle service request. The present subject matter can be utilized for hosting stateless applications, which do not save client data generated in one session for use in a subsequent session with that client, which are generally implemented in serverless computing environments.

Further, quantifying resources in terms of computing units or other units that provide an idea of the resources to be spared and available resources simplifies sharing of the workload.

Although implementations of execution of functions by clusters of computing nodes have been described in language specific to structural features and/or methods, it is to be understood that the present subject matter is not necessarily limited to the specific features or methods described. Rather, the specific features and methods are disclosed and explained as example implementations.

We claim:

1. A system comprising:
a community of clusters of computing nodes; and
a centralized community manager implemented by a processor executing a set of machine-readable instructions to:
monitor resource availability information of clusters of the community of clusters;
receive, from an overloaded cluster of the community of clusters, an identification request to identify a cluster of the community of clusters that can spare X number of computing units, wherein X is an integer larger than one;
responsive to determining, based on the monitored resource availability information, an individual cluster of the community of clusters can spare the X number of computing units, select the individual cluster as a lender cluster; and
responsive to determining, based on the monitored resource availability information, that no individual cluster of the community of clusters can spare the X number of computing units:
determine that the identification request is for executing multiple functions,
determine that a first cluster of the community of clusters can spare a first number of computing units of the X number of computing units, wherein the first number of computing units corresponds with a number of computing units required to execute a first function of the multiple functions,
determine that a second cluster of the community of clusters can spare a second number of computing units of the X number of computing units, wherein the second number of computing units corresponds with a number of computing units required to execute a second function of the multiple functions, and
select the first cluster to execute the first function and the second cluster to execute the second function, wherein the selecting comprises establishing a first lender-borrower relationship between the first cluster and the overloaded cluster, and establishing a second lender-borrower relationship between the second cluster and the overloaded cluster.

2. The system of claim 1, wherein the centralized community manager further operates to:
generate a first token that is usable by the first cluster to verify authenticity of a request from the overloaded cluster to execute the first function; and
generate a second token that is usable by the second cluster to verify authenticity of a request from the overloaded cluster to execute the second function.

3. The system of claim 1, wherein the centralized community manager further operates to:
determine that a fourth cluster of the community of clusters can spare the first number of computing units of the X number of computing units;
determine a lower latency between the overloaded cluster and the first cluster than between the overloaded cluster and the fourth cluster; and
based on the lower latency determination, select the first cluster to execute the first function.

4. The system of claim 1, wherein the first function and the second function are serverless functions and wherein each of the first cluster and second cluster operates to execute functions in a serverless computing environment.

5. A non-transitory computer-readable medium comprising instructions executable by one or more processing resources of a centralized community manager of a community of clusters of computing nodes, the instructions comprising:
monitor resource availability information of clusters of the community of clusters;
receive, from an overloaded cluster of the community of clusters, an identification request to identify a cluster of the community of clusters that can spare X number of computing units, wherein X is an integer number larger than one; and
responsive to determining, based on the monitored resource availability information, that no individual cluster of the community of clusters can spare the X number of computing units:
determine that the identification request is for executing multiple functions,
determine that a first cluster of the community of clusters can spare a first number of computing units of the X number of computing units, wherein the first number of computing units corresponds with a number of computing units required to execute a first function of the multiple functions,
determine that a second cluster of the community of clusters can spare a second number of computing units of the X number of computing units, wherein the second number of computing units corresponds with a number of computing units required to execute a second function of the multiple functions, and
select the first cluster to execute the first function and the second cluster to execute the second function, wherein the selecting further comprises establishing a first lender-borrower relationship between the first cluster and the overloaded cluster, and establishing a second lender-borrower relationship between the second cluster and the overloaded cluster.

6. The non-transitory computer-readable medium of claim 5, wherein the instructions further comprise: generate a token that is usable by the first cluster to verify authenticity of a request from the overloaded cluster to execute the first function.

7. The non-transitory computer-readable medium of claim 5, wherein the instructions further comprise:
determine that a third cluster of the community of clusters can spare the first number of computing units;
determine a lower latency between the overloaded cluster and the first cluster than between the overloaded cluster and the third cluster; and
based on the lower latency determination, select the first cluster to execute the first function.

8. The non-transitory computer-readable medium of claim 5, wherein the multiple functions are serverless functions and the first cluster operates to execute functions in a serverless computing environment.

9. A method comprising:
monitoring resource availability information of clusters of a community of clusters of computing nodes;
receiving, from an overloaded cluster of the community of clusters, an identification request to identify a cluster of the community of clusters that can spare X number of computing units, wherein X is an integer number larger than one;
responsive to determining, based on the monitored resource availability information, an individual cluster of the community of clusters can spare the X number of computing units, selecting the individual cluster as a lender cluster; and
responsive to determining, based on the resource availability information, that no individual cluster of the community of clusters can spare the X number of computing units:
determining that the identification request is for executing multiple functions,
determining that a first cluster of the community of clusters can spare a first number of computing units of the X number of computing units, wherein the first number of computing units corresponds with a number of computing units required to execute a first function of the multiple functions,
determining that a second cluster of the community of clusters can spare a second number of computing units of the X number of computing units, wherein the second number of computing units corresponds with a number of computing units required to execute a second function of the multiple functions, and
selecting the first cluster to execute the first function and the second cluster to execute the second function, wherein the selecting further comprises establishing a first lender-borrower relationship between the first cluster and the overloaded cluster, and establishing a second lender-borrower relationship between the second cluster and the overloaded cluster.

10. The method of claim 9, further comprising: generating a first token that is usable by the first cluster to verify authenticity of a request from the overloaded cluster to execute the first function; and generating a second token that is usable by the second cluster to verify authenticity of a request from the overloaded cluster to execute the second function.

11. The method of claim 9, further comprising: determining that a fourth cluster of the community of clusters can spare the first number of computing units of the X number of computing units; determining a lower latency between the overloaded cluster and the first cluster than between the overloaded cluster and the fourth cluster; and based on the lower latency determination, selecting the first cluster to execute the first function.

* * * * *